United States Patent
Spears

(10) Patent No.: US 6,900,427 B2
(45) Date of Patent: May 31, 2005

(54) PHOTOSENSOR ASSEMBLY WITH SHARED CHARGE TRANSFER REGISTERS AND ELECTRONIC SHUTTERS

(75) Inventor: Kurt Eugene Spears, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/962,115

(22) Filed: Oct. 7, 2004

(65) Prior Publication Data

US 2005/0045809 A1 Mar. 3, 2005

Related U.S. Application Data

(62) Division of application No. 10/209,422, filed on Jul. 30, 2002.

(51) Int. Cl.[7] .................................................. H01J 40/14
(52) U.S. Cl. ................................. 250/214 R; 250/214.1
(58) Field of Search ........................... 250/214 R, 214.1, 250/208.1, 214 P; 348/296, 297, 298, 303, 310

(56) References Cited

U.S. PATENT DOCUMENTS 5,659,359 A * 8/1997 Mochizuki et al. ......... 348/296

* cited by examiner

Primary Examiner—Que T. Le
(74) Attorney, Agent, or Firm—Augustus W. Hinfield

(57) ABSTRACT

A photosensor assembly has multiple rows of photosensors sharing a charge transfer register. Charges from one row of photosensors are transferred through another row of photosensors to the charge transfer register, and charges from both rows of photosensors are optionally added together in the charge transfer register. The photosensors in the two rows may have different light collecting areas.

1 Claim, 7 Drawing Sheets

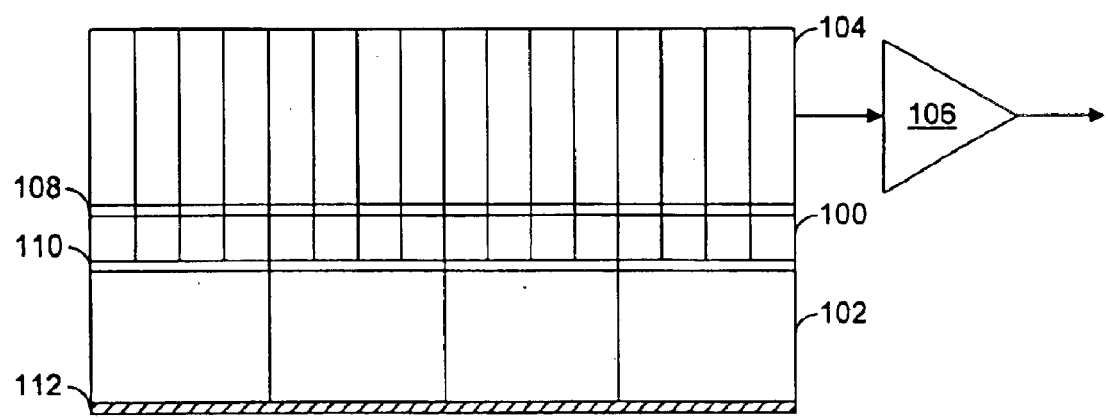
FIG. 1A
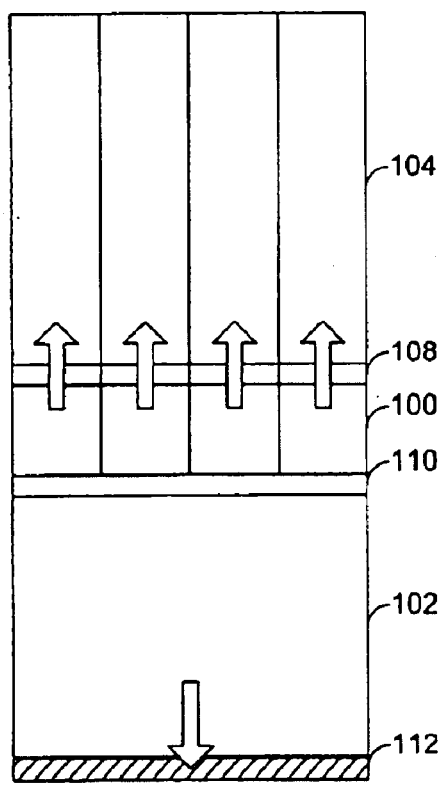 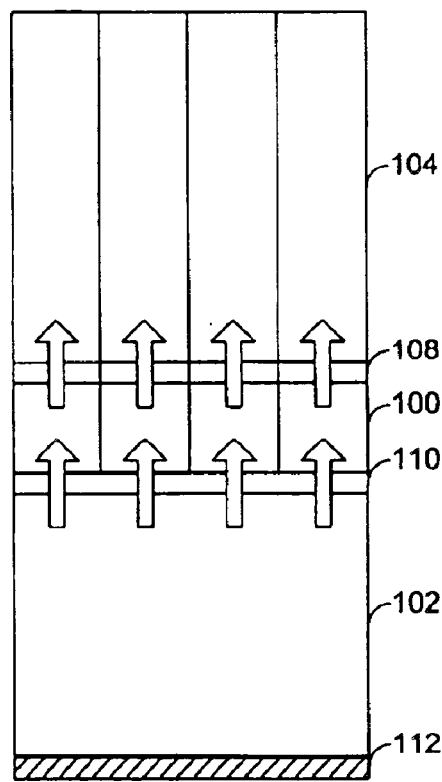
FIG. 1B　　　FIG. 1C

PHOTOSENSOR ASSEMBLY WITH SHARED CHARGE TRANSFER REGISTERS AND ELECTRONIC SHUTTERS

CROSS-REFERENCE TO RELATED APPLICATION(S)

This application is a divisional application of U.S. patent application Ser. No. 10/209,422, filed Jul. 30, 2002, which is hereby incorporated by reference.

FIELD OF INVENTION

This invention relates generally to photosensor arrays and more specifically to linear arrays commonly used for optical image scanners.

BACKGROUND OF THE INVENTION

Image scanners convert a visible image on a document or photograph, or an image in a transparent medium, into an electronic form suitable for copying, storing or processing by a computer. An image scanner may be a separate device or an image scanner may be a part of a copier, part of a facsimile machine, or part of a multipurpose device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices.

Each photosensitive element, in conjunction with the scanner optics system, measures light intensity from an effective area on the document defining a picture element (pixel) on the image being scanned. Optical sampling rate is often expressed as pixels per inch (or mm) as measured on the document (or object, or transparency) being scanned.

Common photosensor technologies include Charge Coupled Devices (CCD), Charge Injection Devices (CID), Complementary-Metal-Oxide (CMOS) devices, and solar cells. Typically, for a CID or a CMOS array, each photosensitive element is addressable. In contrast, CCD linear arrays commonly serially transfer all the charges, bucket-brigade style, from each line array of photosensitive elements to a small number of sense nodes for conversion of charge into a measurable voltage. The present patent document is primarily concerned with photosensor arrays having serial charge transfer registers, also called serial readout registers.

In general, there is an ongoing demand for increased resolution and speed, improved color quality and image quality, and reduced cost. These demands often directly conflict and require trade-offs. Areas of an image with slowly varying color, particularly dark colors, need high bit depth and high signal-to-noise to accurately reproduce the smooth tone and texture of the original, but high sampling rate is not needed because there is no high frequency information in the image. Areas of an image that change color rapidly, for example a forest scene, or a close-up photograph of a multicolored fabric, need a high sampling rate to capture the high frequency information, but high bit depth and high signal-to-noise are not needed. That is, for high frequency information, the color accuracy of each individual pixel is less important. Sensors having a relatively small area (with a correspondingly small pitch) provide high sampling rates, but typically have relatively low signal-to-noise ratios, relatively low bit depth, and relatively low scanning speed. Large sensor areas provide high signal-to-noise, high bit depth, and high speed, but cannot provide high sampling rates.

U.S. patent application Ser. No. 09/430,471 discloses photosensor assemblies that have multiple rows of sensors, with some rows having relatively small sensor areas and other rows having relatively large sensor areas. Different rows may be used for different scans, depending on the needs of each scan. U.S. patent application Ser. Nos. 09/703,960 and 10/080,217 disclose photosensor assemblies with multiple rows of sensors of different sizes, with various structures shared by multiple rows, thereby reducing size and cost. There is a need for additional improvement in photosensor arrays.

SUMMARY

A photosensor assembly has multiple rows of photosensors sharing a charge transfer register. Charges from one row of photosensors are transferred through another row of photosensors to the charge transfer register, and charges from both rows of photosensors are optionally added together in the charge transfer register. The photosensors in the two rows may have different light collecting areas.

BRIEF DESCRIPTION OF THE DRAWINGS

FIG. 1A is a block diagram of a first example embodiment of a photosensor assembly in accordance with the invention.

FIGS. 1B and 1C are expanded portions of FIG. 1A further illustrating charge flow.

DETAILED DESCRIPTION OF EXAMPLE EMBODIMENTS OF THE INVENTION

Figure 2A:
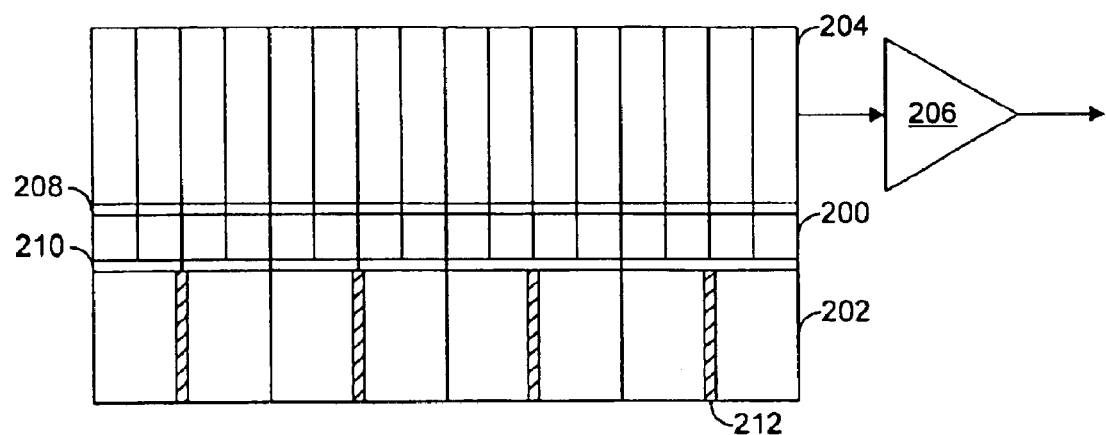
FIG. 2A is a block diagram of a second example embodiment of a photosensor assembly in accordance with the invention.

In FIG. 1A, a photosensor assembly has a first row of relatively small (small light collecting area) photosensors 100, a second row of relatively large (large light collecting area) photosensors 102, and a charge transfer register 104. Charges from row 100 or row 102 are transferred to the charge transfer register 104 and then serially transferred to an amplifier 106 for subsequent conversion to digital values (analog-to-digital converter not illustrated). A set of charge transfer gates 108 controls transfer of charges from row 100 to the charge transfer register 104. A set of charge transfer gates 10 controls transfer of charges from row 102 to row 100.

With intense light or long exposures, photosensor charge wells may saturate, and excess charge may spill over into adjacent photosensor charge wells, resulting in blooming (resulting bright areas in the digitized image are larger than the actual bright areas). In CCD arrays, it is common to provide electronic gates to discharge any excess charges to prevent blooming. If the potential barrier height of the gate is variable, the gate is commonly called an electronic shutter. If the potential barrier is fixed, the gate is commonly called an overflow drain (or antibloom drain). Electronic shutters may be controlled by an external voltage to provide variable integration times, or to completely discharge one or more photosensors. Electronic shutters may be fabricated below the charge wells (called a vertical electronic shutter) or adjacent to photosensors (called a lateral electronic shutter). In general, in the following discussion, where electronic shutters are described, overflow drains could be used as an alternative. Electronic shutters have the advantage of being able to completely discharge a photosensor, whereas overflow drains will leave some residual charge that needs to be removed (for example, by transferring the residual charge to the charge transfer register and shifting it out). In FIG. 1A, when only charges from row 100 are needed, charges from photosensor row 102 are discharged into a lateral electronic shutter 112.

FIG. 1B illustrates part of the assembly of FIG. 1A, further illustrating charge flow for high sampling rates. Charge transfer gates 108 permit each photosensor in row 100 to transfer its charge to the charge transfer register 104. Charge transfer gates 110 prevent charge from the one illustrated photosensor in row 102 from transferring charge to photosensors in row 100. Charge from the one illustrated photosensor in row 102 is discharged by the electronic shutter 112.

FIG. 1C illustrates part of the assembly of FIG. 1A, further illustrating charge flow for low sampling rates. Charge transfer gates 108 permit each photosensor in row 100 to transfer its charge to the charge transfer register 104. Charge transfer gates 110 permit charge from the one illustrated photosensor in row 102 to transfer its charge to the photosensors in row 100, and then on into the charge transfer register 104. The transfer of charges into the charge register may be independent. That is, the charges from photosensors in row 100 may be transferred first. All charges in the transfer register 104 may then be shifted to the amplifier for conversion. Alternatively, if the number of charge transfer register stages is doubled, charges from photosensors in row 100 may be transferred to the charge transfer register, the charge transfer register may then shift one stage, and then the charges from the photosensors in row 102 may be transferred through row 100 into the charge transfer register 104, effectively interleaving charges from rows 100 and 102. However, it may be preferable, for low sampling rates, to use the combined areas and charges of the photosensors in rows 100 and 102, so that charges from photosensors in row 100 are added to charges from the photosensors in row 102. When combined charges are wanted, charges from photosensors in row 102 flow through photosensors in row 100, where some mixing of charges may occur, and the charges from both row 100 and row 102 accumulate in transfer register stages in the charge transfer register 104. If combined areas for low sampling rates are wanted, for the configuration illustrated in FIG. 1A, sequences of four charges from the charge transfer register 104 may be added together as an analog process before analog-to-digital conversion, or sequences of four individual charges from the charge transfer register may be digitized and then added digitally.

FIG. 2A illustrates an alternative example embodiment, illustrating an alternative location for the electronic shutter (s). In FIG. 2A, a photosensor assembly has a first row of relatively small (small light collecting area) photosensors 200, a second row of relatively large (large light collecting area) photosensors 202, and a charge transfer register 204. Charges from row 200 or row 202 are transferred to the charge transfer register 204 and then serially transferred to an amplifier 206 for subsequent conversion to digital values (analog-to-digital converter not illustrated). A set of charge transfer gates 208 controls transfer of charges from row 200 to the charge transfer register 204. A set of charge transfer gates 210 controls transfer of charges from row 202 to row 200. Electronic shutters 212 are positioned between photosensors in photosensor row 202.

Figures 2B, 2C:
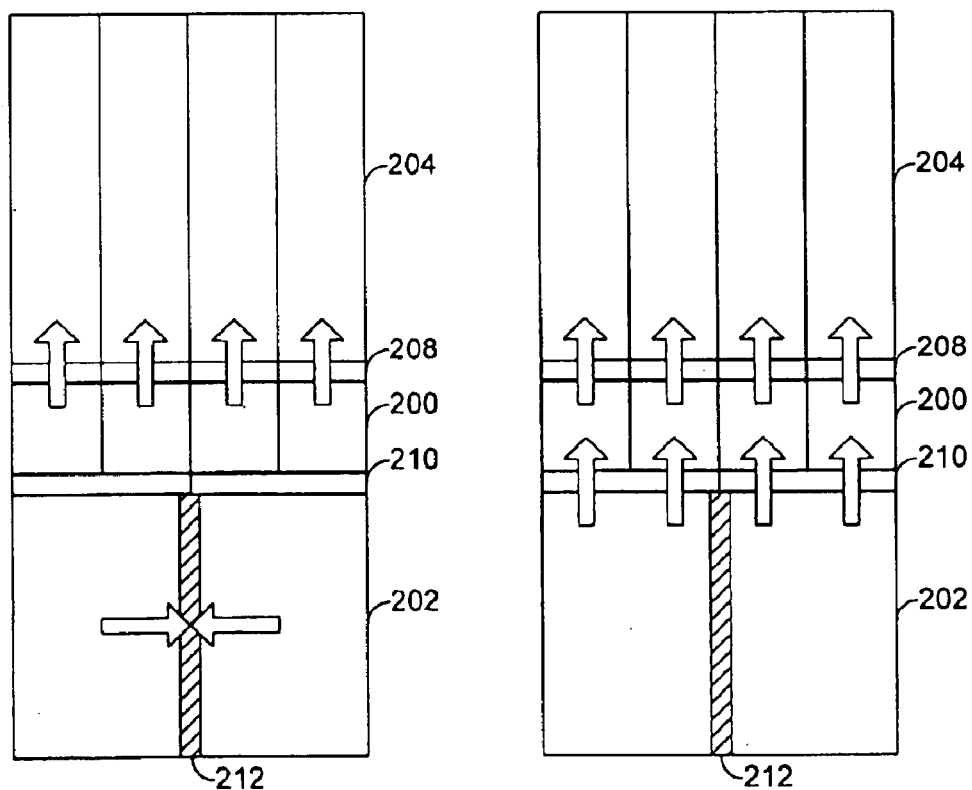
FIGS. 2B and 2C are expanded portions of FIG. 2A further illustrating charge flow.

FIG. 2B illustrates part of the assembly of FIG. 2A, further illustrating charge flow for high sampling rates. Charge transfer gates 208 permit each photosensor in row 200 to transfer its charge to the charge transfer register 204. Charge transfer gates 210 prevent charge from the one illustrated photosensor in row 202 from transferring charge to photosensors in row 200. Charges from the photosensors in row 202 are discharged by the electronic shutter 212.

FIG. 2C illustrates part of the assembly of FIG. 2A, further illustrating charge flow for low sampling rates. Charge transfer gates 208 permit each photosensor in row 200 to transfer its charge to the charge transfer register 204. Charge transfer gates 210 permit charge from each photosensor in row 202 to transfer charge to the photosensors in row 200, and then on into the charge transfer register 204. The transfer of charges into the charge register may be independent.

Figure 3A:
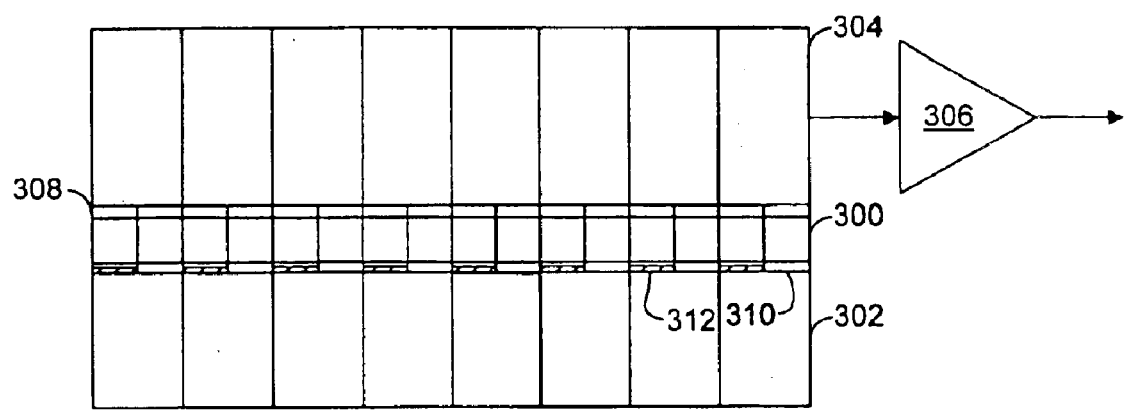
FIG. 3A is a block diagram of a third example embodiment of a photosensor assembly in accordance with the invention.

FIG. 3A illustrates another alternative example embodiment. In FIG. 3A, a photosensor assembly has a first row of relatively small (small light collecting area) photosensors 300, a second row of relatively large (large light collecting area) photosensors 302, and a charge transfer register 304. Charges from row 300 or row 302 are transferred to the charge transfer register 304 and then serially transferred to an amplifier 306 for subsequent conversion to digital values (analog-to-digital converter not illustrated). A set of charge transfer gates 308 controls transfer of charges from row 300 to the charge transfer register 304. Charge transfer gates 308 are logically separated into even gates and odd gates, as explained in more detail in conjunction with FIG. 3B.

In the example embodiment of FIG. 3A, there is a charge transfer gate 310 for each photosensor in photosensor row 302 that permits each photosensor in row 302 to transfer its charge through a photosensor in row 300 to the charge transfer register 304. In addition, there is an electronic shutter 312 for each photosensor in photosensor row 302, positioned on the same side of the photosensor as the charge transfer gate 310. Of the three alternative positions for electronic shutters shown in FIGS. 1A, 2A, and 3A, the position shown in FIG. 3A may be preferable for large photosensor area. Sometimes, for large area CCD photosensors, there is a steady-state voltage potential from one side to the other to help force charge toward the charge transfer gate. If there is such a potential, then it is preferable to place the electronic shutter on the same side as the charge transfer gate to take advantage of the voltage potential in assisting discharge through the electronic shutter.

Some scanners provide an ability to scan opaque documents and also scan transparent media such as film negative strips and slides. Typically, the optical sampling rate needed for film strips and slides is much higher than the sampling rate needed for opaque documents. Accordingly, for a photosensor assembly as illustrated in FIGS. 1A, 2A, and 3A, the row of small photosensors may be used for transparent media, and all photosensors may be used for opaque media. If the scanner is used most of the time for opaque media, improving the performance for opaque media at the expense of performance for transparent media may be an acceptable tradeoff. In the example embodiment of FIG. 3A, there are only half as many charge transfer register stages as there are photosensors in row 300. Reducing the number of charge transfer register stages improves performance for low sampling rates, because fewer shifts are required for each scanline. For high sampling rates, half of the photosensors in row 300 (for example the even numbered photosensors in row 300) may transfer charges to the charge transfer register, and those charges may be shifted out and converted, and then the remaining half of the charges may be transferred and shifted.

Figure 3B:
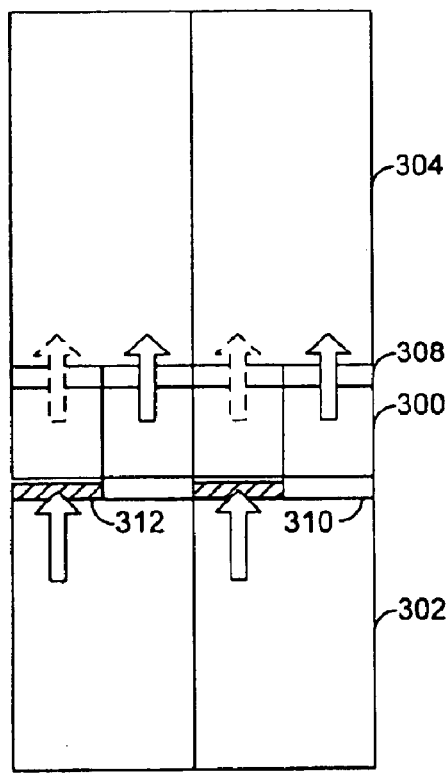
FIGS. 3B and 3C are expanded portions of FIG. 3A further illustrating charge flow.

FIG. 3B illustrates part of the assembly of FIG. 3A, further illustrating charge flow for high sampling rates. Assume for purposes of explanation that the photosensors 300 and charge transfer gates 308 are numbered, starting with number zero for the photosensor and charge transfer gate closest to the amplifier 306. When even numbered charge transfer gates 308 are enabled, charge from even numbered photosensors 300 are transferred to the charge transfer register 304, as depicted by arrows with solid lines in FIG. 3B. When odd numbered charge transfer gates 308 are enabled, charge from odd numbered photosensors 300 are transferred to the charger transfer register 304, as depicted by arrows with broken lines in FIG. 3B. Charge transfer gates 310 prevent charge from the photosensors in row 302 from transferring charge to photosensors in row 300. Charges from the photosensors in row 302 are discharged by the electronic shutters 312.

Figure 3C:
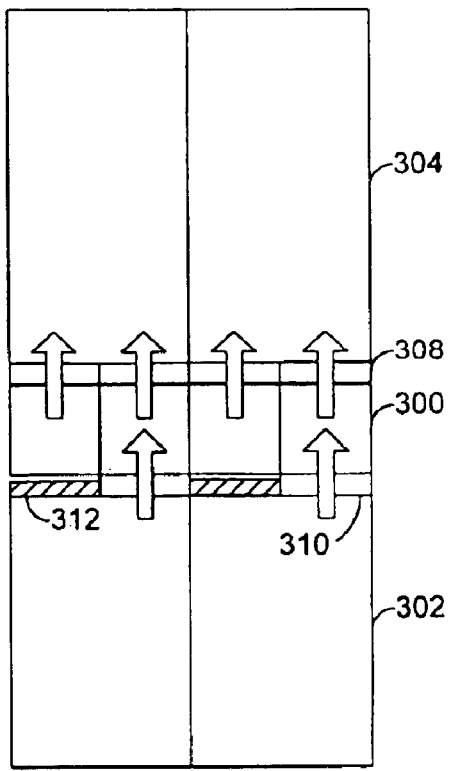

FIG. 3C illustrates part of the assembly of FIG. 3A, further illustrating charge flow for low sampling rates. Charge transfer gates 308 permit each photosensor in row 300 to transfer its charge to the charge transfer register 304. If charges from rows 300 and 302 are to be added in the charge transfer register, then all charges from row 300 can transfer simultaneously. Charge transfer gates 310 permit charge from each photosensor in row 302 to transfer charge through one photosensor in row 300 and then on into the charge transfer register 304.

Figure 4:
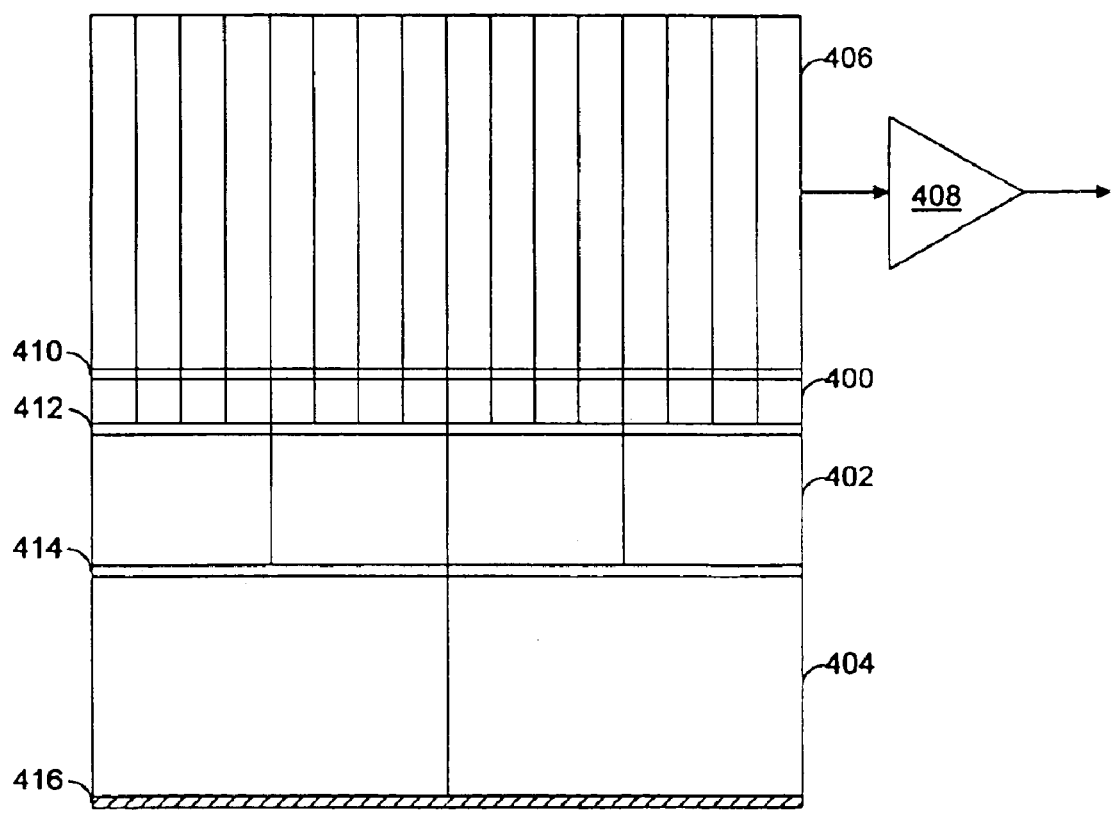
FIG. 4 is a block diagram of a fourth example embodiment of a photosensor assembly in accordance with the invention.

Additional rows may be added. For example, in FIG. 4, there is a first row of photosensors 400, a second row of photosensors 402, and a third row of photosensors 404, all sharing a charge transfer register 406. Charges from the charge transfer register 406 are shifted to an amplifier 408 for subsequent conversion to digital values. A set of charge transfer gates 410 controls transfer of charges from row 400 to the charge transfer register 406. A set of charge transfer gates 412 controls transfer of charges from row 402 to row 400. A set of charge transfer gates 414 controls transfer of charges between row 402 and row 404. Charges from row 404, or both rows 402 and 404, are discharged by a lateral electronic shutter 416, as discussed in more detail below.

When the lowest optical sampling rate is used, charges from row 404 are transferred through row 402, charges from row 402 are transferred through row 400, and all charges are optionally added together in the charge transfer register 406. When an intermediate optical sampling rate is used, charges from row 402 are transferred through row 400 to the charge transfer register 406, and charges from row 404 are discharged by the electronic shutter 416. When the highest optical sampling rate is used, charges from row 400 are transferred to the charge transfer register 406, charges from row 404 are discharged by the electronic shutter 416, and charges from row 402 transfer or overflow into row 404 which is subsequently discharged by the electronic shutter 416. The electronic shutter 416 may alternatively be located between large photosensors as illustrated in FIG. 2A, or adjacent to charge transfer gates as illustrated in FIG. 3A. Alternatively, electronic shutters may be positioned for use by row 402 alone, or electronic shutters may be provided for both rows 402 and 404.

In document scanners for scanning color images, it is common to provide at least three separate rows, or sets of rows, of photosensors for receiving at least three different wavelengths of light, for example, red, green, and blue. In some document scanners, an array of lenses is used to focus light from multiple scanlines on the document being scanned onto the rows of photosensors, or a color separator may be used to focus light from multiple scanlines on the rows of photosensors. In FIG. 1A, if charges from the large photosensors in row 102 are to be combined with charges from the small photosensors in row 100, then it is preferable for row 100 and row 102 to be physically close together so that they effectively image a single scanline on the document being scanned. In addition, for cost and size reduction, it is preferable to share structures such as charge transfer registers.

Figure 5:
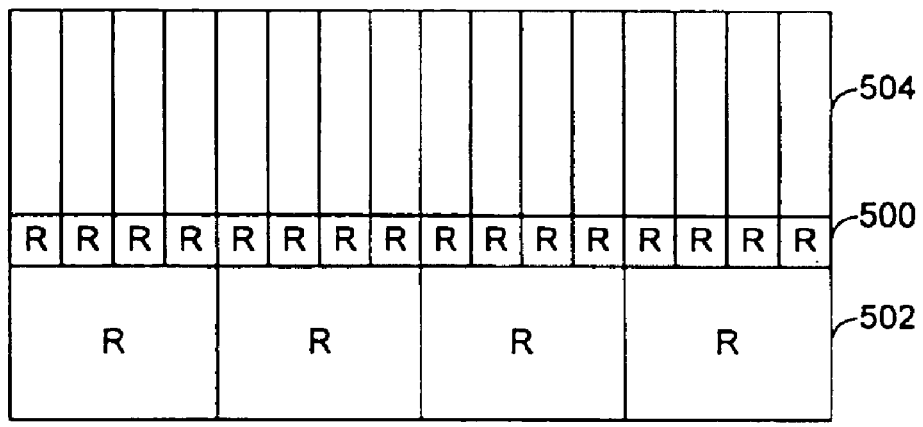
FIG. 5 is a block diagram illustrating an example embodiment of a photosensor assembly for scanning multiple bands of wavelengths in accordance with the invention.
Figure 5:
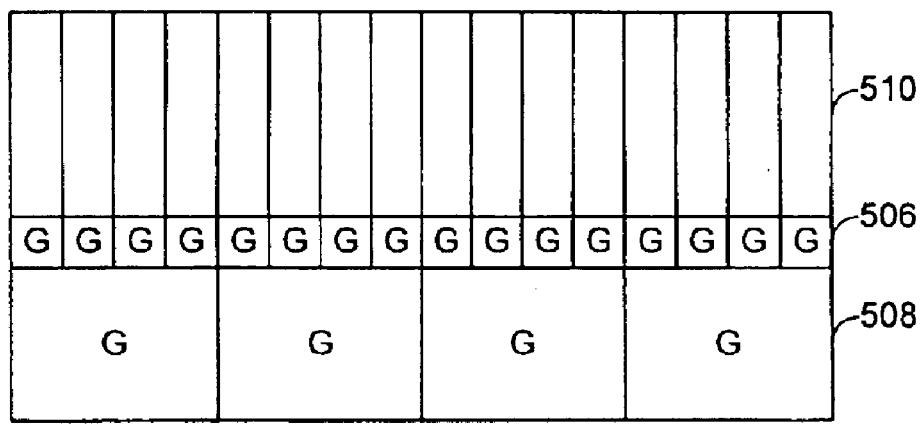
Figure 5:
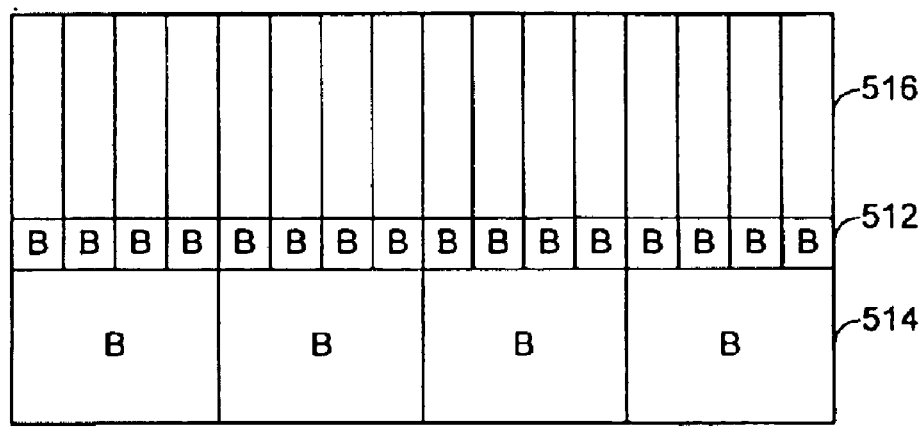

In FIG. 5, a configuration as in FIG. 1A is used for an assembly for receiving three bandwidths of light. To simplify the illustration, transfer gates, amplifiers, and other details are not included. In FIG. 5, a row of relatively small photosensors 500 for receiving red light, and a row of relatively large photosensors 502 for receiving red light, share a charge transfer register 504. A row of relatively small photosensors 506 for receiving green light, and a row of relatively large photosensors 508 for receiving green light, share a charge transfer register 510. Likewise, a row of relatively small photosensors 512 for receiving blue light, and a row of relatively large photosensors 514 for receiving blue light, share a charge transfer register 516. Note that only three charge transfer registers (504, 510, and 516) are needed for six rows of photosensors, and also note that rows receiving the same color of light (500, 502) (506, 508) (512, 514) are physically close together.

Figure 6:
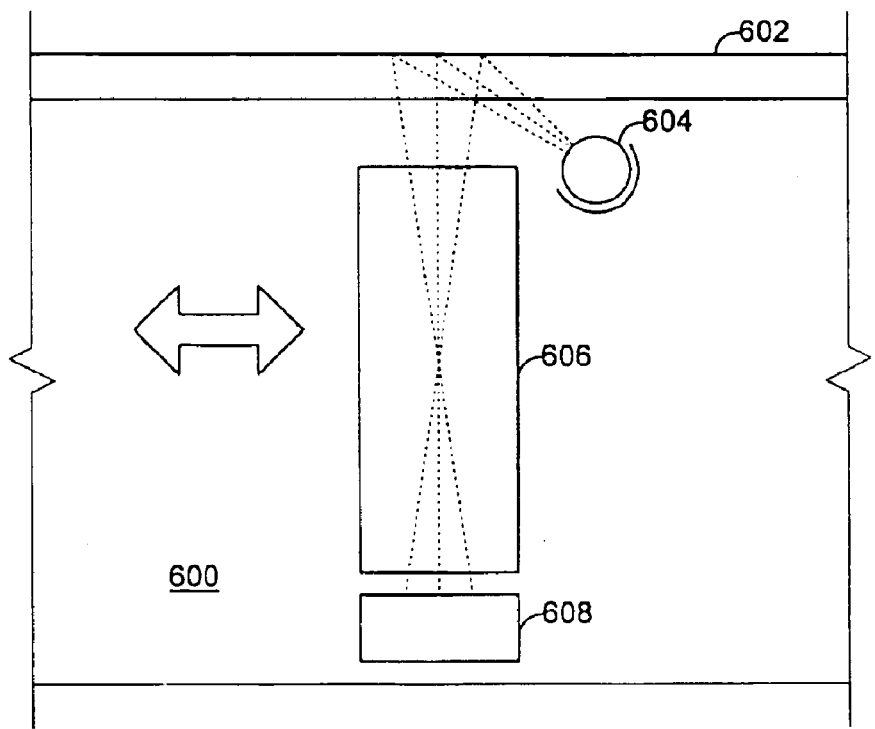
FIG. 6 is a cross-section side view of a portion of a first example embodiment of a scanner incorporating a photosensor assembly in accordance with the invention.

FIG. 6 illustrates a portion of an example scanner 600. The scanner 600 includes a transparent platen 602, a light source 604, a lens array 606, and a photosensor assembly 608. A document to be scanned may be placed on the top surface of the platen 602. For color scanning, the photosensor assembly 606 may include at least three sets of rows of photosensors for sensing three different wavelengths, as illustrated for example in FIG. 5. The lens array 606 focuses at least three scanlines, from the document being scanned, onto the photosensor assembly 606. For a photosensor assembly as illustrated in FIG. 5, each scanline on the document may be focused onto two rows of photosensors, for example rows 500 and 502 in FIG. 5.

Figure 7:
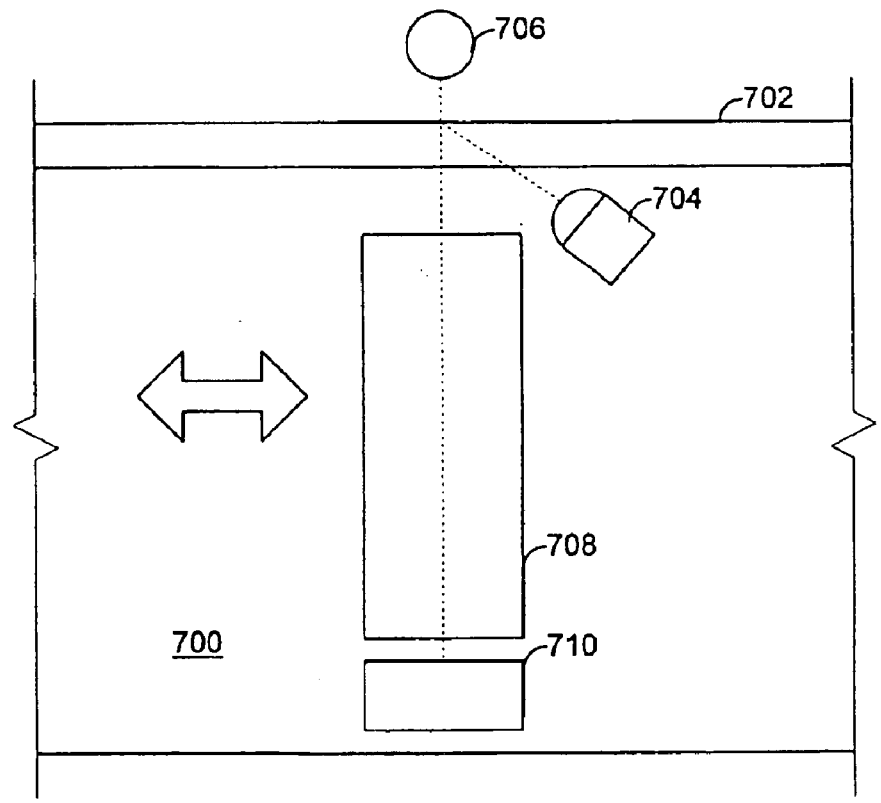
FIG. 7 is a cross-section side view of a portion of a second example embodiment of a scanner incorporating a photosensor assembly in accordance with the invention.

FIG. 7 illustrates an alternative example scanner 700. The scanner 700 includes a transparent platen 702, a light source for opaque documents 704, a light source for transparent media 706, a lens array 708, and a photosensor assembly 710. A document to be scanned may be placed on the top surface of the platen 702. For color scanning, the light source 704 may provide light having a first bandwidth (for example red), and selected photosensor charges may be shifted to the analog-to-digital converter. Then, the light source 704 may provide light having a second bandwidth (for example, green), and selected photosensor charges may be shifted to the analog-to-digital converter. Then, the light source 704 may provide light having a third bandwidth (for example, blue), and selected photosensor charges may be shifted to the analog-to-digital converter. Light source 704, may be, for example, an array of red, green, and blue Light Emitting Diodes (LED's). For transparent media, light source 706 provides a similar role, providing light through the media. For the embodiment illustrated in FIG. 7, a photosensor assembly as in FIG. 3A is particularly suitable, for the reasons discussed in conjunction with FIG. 3A.

Figure 8:
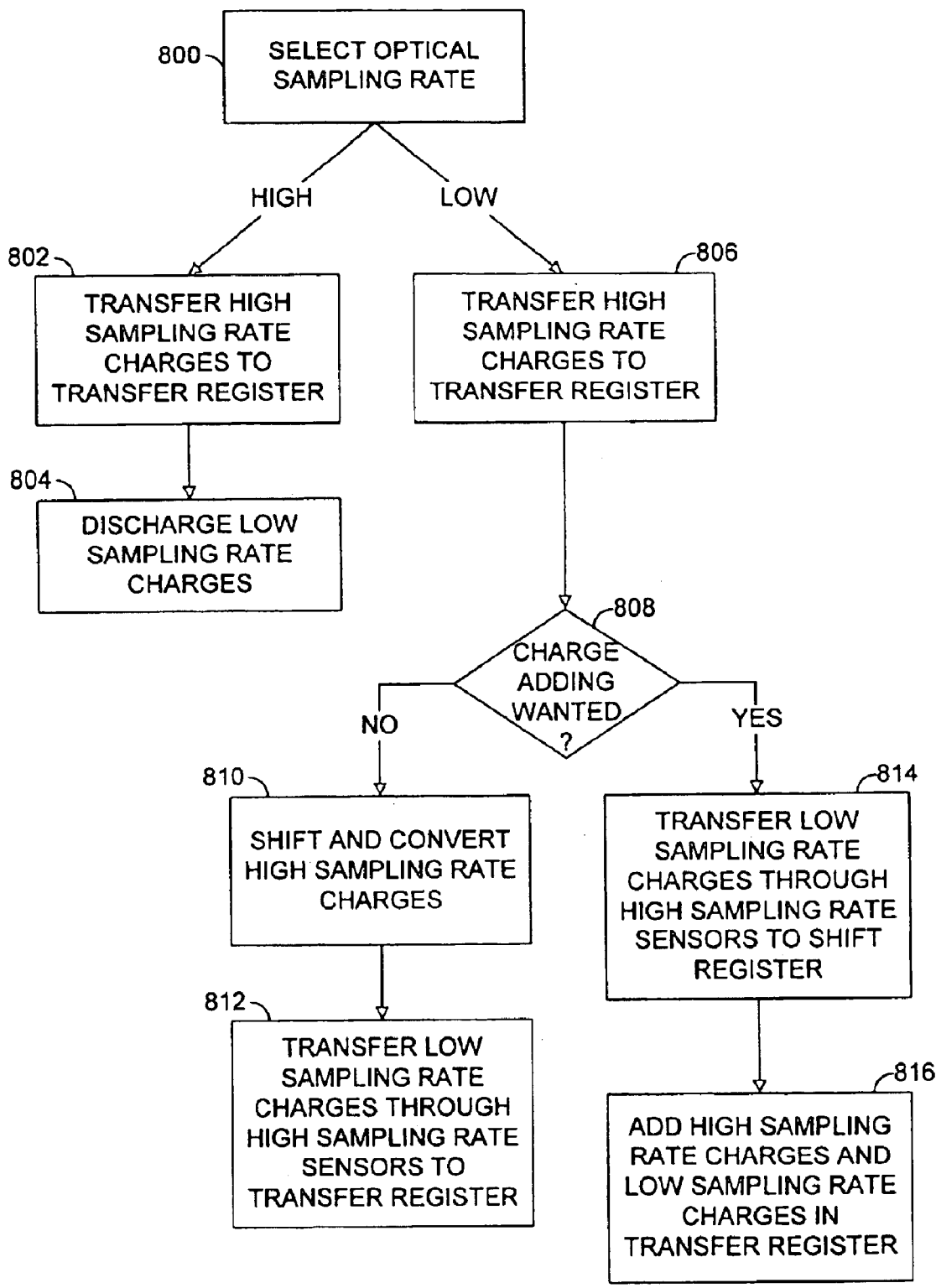
FIG. 8 is a flow chart illustrating a example method in accordance with the invention.

FIG. 8 illustrates an example embodiment of a method in accordance with the invention. At step 800, an optical sampling rate is selected. Only two sampling rates are illustrated in FIG. 8, but there may be more than two, as illustrated, for example, in FIG. 4. For a high sampling rate, at step 802, the charges from the photosensors for the high sampling rate are transferred to a charge transfer register, and at step 804, the charges from the photosensors used only for the low sampling rate are discharged or overflow continuously after an initial accumulation. For a low sampling rate, at step 806, the charges from the photosensors for the high sampling rate are transferred to a charge transfer register. If charge adding is not wanted (decision 808), then the high sampling rate charges are shifted to the analog-to-digital converter and converted (step 810). After the charge transfer register has been emptied, then the low sampling rate charges are transferred to the charge transfer register (step 812). If charge adding is wanted, then at step 814, the charges from the photosensors used only for the low sampling rate are transferred through the photosensors for the high sampling rate and at step 816, the charges are accumulated in the charge transfer register.

The assemblies illustrated in FIGS. 1A, 2A, 3A and 4 have only a few photosensors per row for simplicity of illustration. A document scanner may have, for example, 2,500 to 10,00 photosensors per row. Photosensor row arrays may be curved to compensate for lens distortion. Additional rows may be added for other purposes, as taught in U.S. patent application Ser. No. 09/703,960.

The ratio of small photosensors to large photosensors in FIGS. 1A, 2A, 3A, and 4 is for purposes of illustration only. The ratio may be one to one, and is not restricted to an integer ratio. For the example illustrated ratio of four small photosensors for each large photosensor in FIG. 1A, it is useful for the total area of one large photosensor and four small photosensors to be approximately square and about sixteen times the area of one small photosensor. This provides two-dimensional symmetry for low sampling rates, while reducing the size of the large photosensors relative to an assembly that does not combine the charges from both large and small photosensors.

The relative sizes of the individual stages in the charge transfer registers in FIGS. 1A, 2A, 3A, and 4 are also for purposes of illustration only. For example, for the configuration illustrated in FIG. 1A, each stage of the charge transfer register needs to be large enough to accumulate charge from one small photosensor plus one-fourth of the charge from one large transfer register.

The charge transfer registers illustrated in FIGS. 1A, 2A, 3A, and 4 have been simplified for illustration. Charge transfer registers are typically split into multiple phases so that during shifting, each charge is shifted into an empty stage in a controlled direction.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A photosensor assembly, comprising:

first and second rows of photosensors, where there is a plurality of photosensors in the first row of photosensors for each photosensor in the second row of photosensors; and photosensors in the second row of photosensors logically grouped into pairs of photosensors, with an electronic shutter between each of the photosensors in a pair of photosensors.

* * * * *